(12) United States Patent
Clark et al.

(10) Patent No.: US 9,588,243 B2
(45) Date of Patent: Mar. 7, 2017

(54) LAND SEISMIC DEVICES, SYSTEMS AND METHODS

(71) Applicant: Schlumberger Technology Corporation, Sugar Land, TX (US)

(72) Inventors: Mike Clark, West Lothian (GB); Duncan Mackie, Aberdeenshire (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 647 days.

(21) Appl. No.: 13/680,104

(22) Filed: Nov. 18, 2012

(65) Prior Publication Data
US 2014/0140173 A1    May 22, 2014

(51) Int. Cl.
*G01V 1/137* (2006.01)
*G01V 1/42* (2006.01)
*G01V 1/047* (2006.01)

(52) U.S. Cl.
CPC .............. *G01V 1/137* (2013.01); *G01V 1/047* (2013.01); *G01V 1/42* (2013.01); *G01V 2210/161* (2013.01)

(58) Field of Classification Search
CPC .................................. G01V 1/137; G01V 1/42
USPC ......................................................... 367/140
See application file for complete search history.

(56) References Cited

U.S. PATENT DOCUMENTS

| | | | |
|---|---|---|---|
| 3,779,335 A * | 12/1973 | Chelminski | G01V 1/09 181/114 |
| 4,182,428 A | 1/1980 | Savit, II | |
| 4,427,045 A * | 1/1984 | Headrick | B65D 90/52 220/563 |
| 4,597,464 A * | 7/1986 | Chelminski | G01V 1/006 181/114 |
| 2008/0101157 A1* | 5/2008 | Ronnekleiv | G01V 1/20 367/64 |
| 2009/0122646 A1* | 5/2009 | Lou | G01V 1/42 367/57 |

(Continued)

FOREIGN PATENT DOCUMENTS

| WO | 89/06624 | 7/1989 | |
|---|---|---|---|
| WO | WO 8906624 A1 * | 7/1989 | ............... A45F 3/20 |

OTHER PUBLICATIONS

P. Breton, et al., "Well Positioned Seismic Measurements," Oilfield Review, pp. 32-45, Spring, 2002.

(Continued)

*Primary Examiner* — James Hulka
*Assistant Examiner* — John T Nolan
(74) *Attorney, Agent, or Firm* — Trevor G. Grove (57) ABSTRACT

Devices, systems and methods for land seismic. The devices include an above-ground storage tank in which an acoustic energy source is immersed in liquid. The above-ground storage tank may be portable, reusable, self-supporting and may lay flat when empty of liquid and rise on its own when being filled with liquid. The systems include the seismic source-storage tank device, one or more sensors for recording signals that are generated when the source is activated, and a processor for analyzing the recorded signals for geophysical information. The methods involve methods of inducing seismic waves using the seismic source-storage tank devices, and methods of conducting seismic surveys using the seismic source-storage tank devices.

19 Claims, 6 Drawing Sheets

(56) References Cited

U.S. PATENT DOCUMENTS

2011/0272413 A1* 11/2011 Yaremenko ........ B65D 88/1606
220/563
2012/0008459 A1* 1/2012 Coste .................... G01V 1/005
367/23
2012/0067118 A1 3/2012 Hartog

OTHER PUBLICATIONS

Barberan, C. et al., "Multi-offset seismic acquisition using optical fiber behind tubing," EAGE 2012, Copenhagen, Denmark.
Cranch, G.A. and P.J. Nash, "Large-scale multiplexing of interferometric fiber-optic sensors using TDM and DWDM," Journal 4664774 of Lightwave Technology, 19(5): p. 687-699 (2001).
"Portable Inflatable GunPit," IP.com No. IPCOM000193148D, published on Feb. 12, 2010.
International search report and written opinion for the equivalent PCT patent application No. PCT/US2013/069525 issued on Feb. 13, 2014.

* cited by examiner

LAND SEISMIC DEVICES, SYSTEMS AND METHODS

FIELD

The present disclosure relates to the study of underground formations and structures, for example as it relates to oil and gas exploration. The present disclosure relates more specifically to land seismic devices, systems and methods.

BACKGROUND

Borehole seismic surveys permit geoscientists to analyze subsurface structural features, for example to evaluate the production potential beneath a plot of land. Generally, surface-induced seismic pulses from airgun sources generate seismic waves that travel underneath the earth's surface. The seismic waves are reflected off subsurface formations, and are usually recorded by downhole sensors. The recorded waves can be analyzed for geophysical information.

Surface-induced seismic pulses generated by airguns normally require a gun pit to be dug in the ground, which is then suitably lined and filled with water. The pits should be at least 10 m diameter and 8 m deep with 45 degree sloping sides (for a 2×150 cu. in. airgun source at 2000 psi). Problems can arise with this approach to generating seismic pulses because constructing an ideal gun pit is challenging. For example, any change in the shape of the pit may impact source signature consistency and shot quality, and ground conditions may lead to pit wall collapse or a buildup of loose soil/sand directly beneath the air gun during use. Liners often fail to protect against this damage by tilting, buckling, and/or cracking and potentially ultimately collapsing under continuous firing of the airgun.

SUMMARY

The disclosure relates to land seismic devices, systems and methods. In some embodiments, the land seismic devices relate to an acoustic energy source and suitable pit; the land seismic systems relate to an acoustic energy source and pit, sensors for recording signals generated by firing of the acoustic energy source, and processors for analyzing the data; and the methods involve using the seismic devices and systems for land seismic investigations.

In some embodiments, the land seismic devices include a source of acoustic energy, a source controller to initiate discharge of the acoustic energy source, and a storage tank for holding the source of acoustic energy immersed in liquid, for example water. In some embodiments, the storage tank is an above-ground storage tank (which may be set up above ground or in a pit dug in the ground). In further embodiments, the storage tank is configured to hold a desired volume of liquid and to hold the acoustic source of energy below the surface of the liquid and/or above the bottom of the tank. In some embodiments, the storage tank is an onion storage tank. In some embodiments, the storage tank is self-supporting, rises on its own as it fills with liquid, lies flat when empty of liquid for ease of portability, and can withstand pressure generated when the source of acoustic energy is fired, remaining intact over repeated source firings and/or maintaining same or similar source signature over repeated source firings, for example for at least 100 source firings, or for example at least 1000 source firings, or for example at least several thousand shots or more. In further embodiments, the storage tank is configured with a splash guard around its top opening to alleviate or prevent liquid from flowing over the top of the tank when the acoustic energy source is fired.

In some embodiments, the land seismic systems include a storage tank containing a volume of liquid (e.g., water) and a source of acoustic energy immersed in the volume of liquid, one or more sensors for recording signals generated by firing the acoustic energy source, and a processor for analyzing the recorded signals for geophysical information. In some embodiments, the storage tank is an onion tank. In some embodiments, the storage tank is self-supporting, rises on its own as it fills with liquid, lies flat when empty of liquid for ease of portability, and can withstand pressure generated when the source of acoustic energy is fired, remaining intact over repeated source firings and/or maintaining same or similar source signature over repeated source firings. In some embodiments, the sensors are configured for use in downhole environments.

In some embodiments, the methods are methods for inducing seismic pulses and include initiating a source of acoustic energy immersed in liquid contained in a storage tank. In some embodiments, the storage tank is an onion tank. In some embodiments, the storage tank is self-supporting, rises on its own as it fills with liquid, lies flat when empty of liquid for ease of portability, and can withstand pressure generated when the source of acoustic energy is fired, remaining intact over repeated source firings and/or maintaining same or similar source signature over repeated source firings. In some embodiments, the methods are land seismic methods involving initiating a source of acoustic energy which is immersed in liquid contained in a storage tank (such as for example an onion tank or a storage tank that is self-supporting, rises on its own as it fills with liquid, lies flat when empty of liquid for ease of portability, and can withstand pressure generated when the source of acoustic energy is fired, remaining intact over repeated source firings and/or maintaining same or similar source signature over repeated source firings), using one or more sensors to record signals generated by activating the source, and analyzing data obtained from the recorded signals for geophysical information. In some embodiments, the one or more sensors are located in a subsurface well, for example are deployed on a drill string.

The identified embodiments are exemplary only and are therefore non-limiting. The details of one or more non-limiting embodiments of the disclosure are set forth in the accompanying drawings and the descriptions below. Other embodiments of the invention should be apparent to those of ordinary skill in the art after consideration of the present disclosure.

DESCRIPTION OF THE DRAWINGS

Certain embodiments of the present disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Illustrative embodiments and aspects are described below. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having the benefit of this disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common United States patent law definition of "comprising" and is therefore interpreted to be an open term meaning "at least the following" and is also interpreted not to exclude additional features, limitations, aspects, etc.

The term "about" is meant to account for variations due to experimental error. All measurements or numbers are implicitly understood to be modified by the word about, even if the measurement or number is not explicitly modified by the word about.

The term "substantially" (or alternatively "effectively") is meant to permit deviations from the descriptive term that don't negatively impact the intended purpose. Descriptive terms are implicitly understood to be modified by the word substantially, even if the term is not explicitly modified by the word substantially.

"Measurement While Drilling" ("MWD") can refer to devices for measuring downhole conditions including the movement and location of the drilling assembly contemporaneously with the drilling of the well. "Logging While Drilling" ("LWD") can refer to devices concentrating more on the measurement of formation parameters. While distinctions may exist between these terms, they are also often used interchangeably. For purposes of this disclosure MWD and LWD are used interchangeably and have the same meaning. That is, both terms are understood as related to the collection of downhole information generally, to include, for example, both the collection of information relating to the movement and position of the drilling assembly and the collection of formation parameters.

Figure 1:
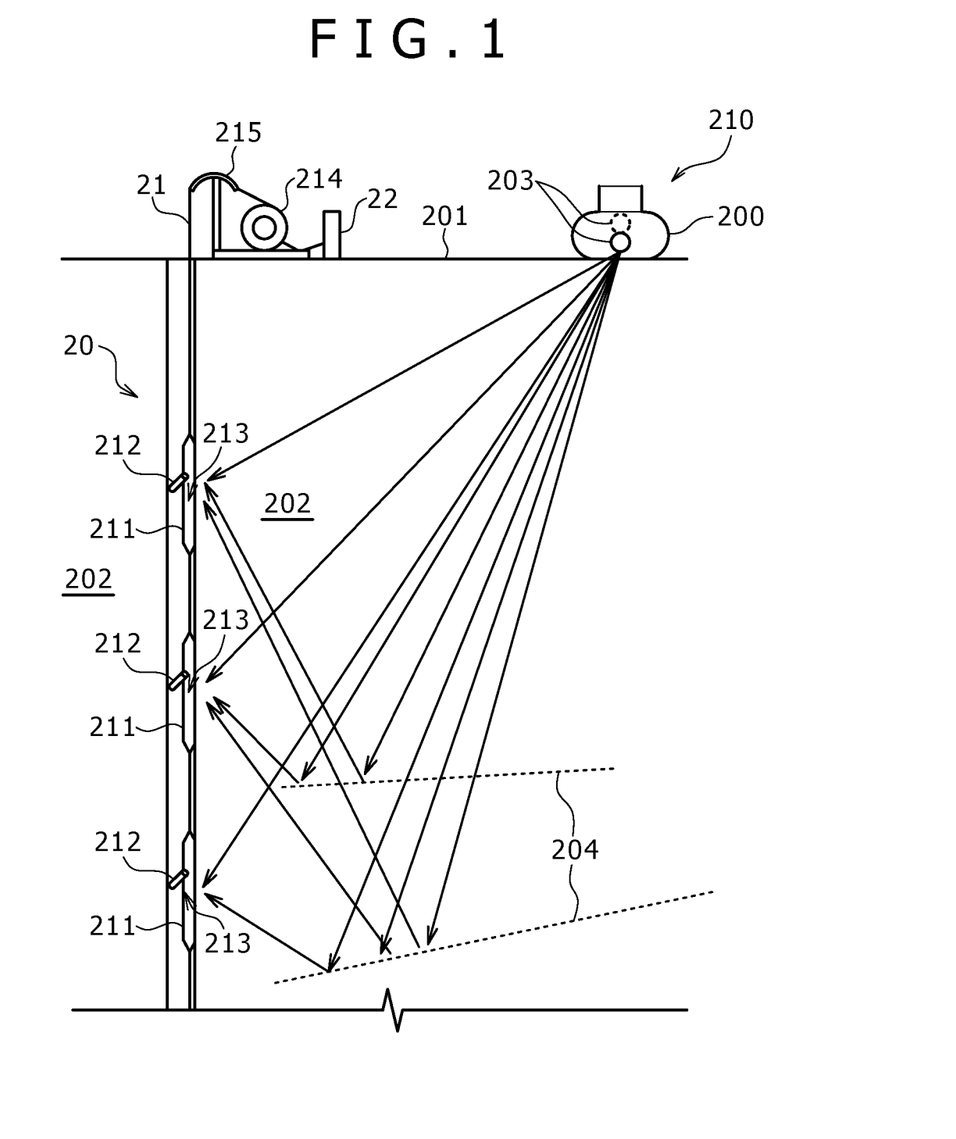
FIG. 1 is a schematic illustration of a vertical seismic profiling ("VSP") operation suitable for use with embodiments of devices, systems and methods of this disclosure.

An example vertical seismic profile ("VSP") acquisition in a borehole is illustrated in FIG. 1. A cable 21 carrying a plurality of VSP shuttles 211 is suspended from the surface 201 of a borehole 20 into the borehole 20. Data is recorded after pushing or wedging the shuttles 211 against the formation 202 or any casing surrounding the wellbore 20 using any suitable means, including inflatable bellows, or as shown, a clamping or locking mechanism 212, then activating a land seismic device.

The clamping or locking mechanism 212 can be based on the use of springs, telescopic rams or pivoting arms. The shuttles 211 typically carry transducer elements (sensors) 213 to measure the velocity or acceleration in three independent directions. The clamping mechanism 212 couples the transducers 213 to the borehole wall.

On the surface, a cable reel 214 and feed 215 supports the cable 21. Measurement signals or data are transmitted through the cable 21 to a base station 22 on the surface for further processing. The cable 21 is typically an armored cable as used for wireline operations with a plurality of wire strands running through its center.

In operation, a land seismic device 210 is activated generating seismic waves which travel through the formation 202. The device 210 is stylistically represented but suitable embodiments are described in further detail herein, for example in connection with FIG. 3 and FIG. 4. Where there are changes in formation impedance (as indicated by dashed lines 204), part of the seismic energy may be reflected and/or refracted. Transducers 213 register movements of the earth and the measurements are transmitted directly or after in-line digitization and/or signal processing to the surface base station 22 for storage, transmission and/or further processing. Processors/electronics systems for accomplishing these tasks are discussed in connection with FIG. 2.

Figure 2:
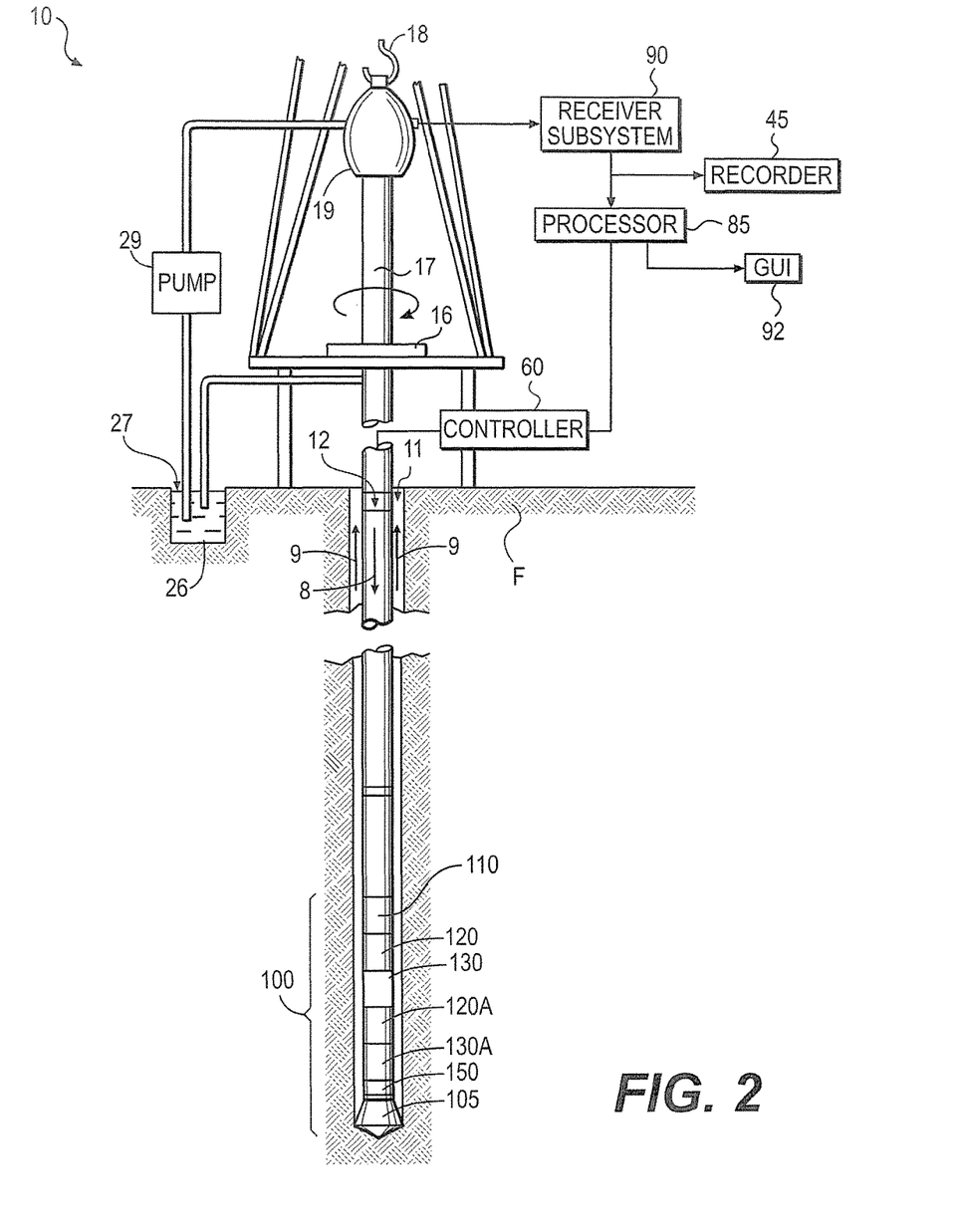
FIG. 2 is a schematic illustration of a well data acquisition and logging system suitable for use with embodiments of devices, systems and methods of this disclosure.

FIG. 2 illustrates an embodiment of a well-site system in which the present disclosure can be employed, in this case a well data acquisition and logging system, positioned over a wellbore 11 for exploring a formation F. Although not shown in FIG. 2, a source 203 such as shown in FIG. 1 can also be positioned above-ground and used to perform seismic surveying with the system of FIG. 2. In the illustrated embodiment, the wellbore 11 is formed by rotary drilling in a manner that is known in the art. Those of ordinary skill in the art given the benefit of this disclosure will appreciate, however, that the subject matter of this disclosure also finds application in directional drilling applications as well as rotary drilling, and is not limited to land-based rigs.

Also referring to FIG. 2, a drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string 12. The drill string 12 is suspended from a hook 18, attached to a traveling block (also not shown), through the kelly 17 and a rotary swivel 19 which permits rotation of the drill string 12 relative to the hook 18. As is well known, a top drive system could alternatively be (and is generally) used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall of the borehole 11, as indicated by the directional arrows 9. In this manner, the drilling fluid 26 lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a rotosteerable system and motor 150, and drill bit 105.

The LWD module 120 is housed in a drill collar, and can contain one or more types of logging tools. It will also be understood that more than one LWD and/or MWD module can be employed, e.g. as represented at 120A or 130A in the case of an LWD or MWD module. (References, throughout, to a module at the position of 120, 130 can alternatively mean a module at the position of 120A, 130A as well, respectively.) The LWD module 120 includes capabilities for measuring, processing, and storing information, as well as for communicating with the surface equipment. In the present embodiment, the LWD module 120 includes a seismic measuring device. One such LWD tool can be of the type disclosed in P. Breton et al., "Well Positioned Seismic Measurements," Oilfield Review, pp. 32-45, Spring, 2002. The downhole LWD tool can have a single receiver or plural receivers.

The MWD module 130 is also housed in a drill collar, and can contain one or more devices for measuring characteristics of the drill string and drill bit. For example, the MWD module 130 may include one or more of the following types of measuring devices: a weight-on-bit measuring device, a torque measuring device, a vibration measuring device, a shock measuring device, a stick slip measuring device, a direction measuring device, and an inclination measuring device. The MWD tool 130 can further include an apparatus (not shown) for generating electrical power to the downhole system. This may typically include a mud turbine generator powered by the flow of the drilling fluid, it being understood that other power and/or battery systems may be employed.

The BHA 100 may also include a surface/local communications subassembly 110, which may be configured to enable communication between the tools in the LWD and/or MWD modules 120, 120A, 130, 130A and processors at the earth's surface. For example, the subassembly 110 may include a telemetry system that includes an acoustic transmitter that generates an acoustic signal in the drilling fluid (a.k.a. "mud pulse") that is representative of measured downhole parameters. The acoustic signal is received at the surface by instrumentation that can convert the acoustic signals into electronic signals. For example, the generated acoustic signal may be received at the surface by transducers. The output of the transducers may be coupled to an uphole receiving system 90, which demodulates the transmitted signals. The output of the receiving system 90 may be coupled to a computer processor 85 and a recorder 45. The computer processor 85 may be coupled to a monitor that employs a graphical user interface ("GUI") 92 through which the measured downhole parameters and particular results derived therefrom are graphically or otherwise presented to the user. In some embodiments, the data is acquired real-time and communicated to the back-end portion of the data acquisition and logging system. In some embodiments, the well logging data may be recorded in the memory in downhole tools for later retrieval.

The well-site system is also shown to include an electronics subsystem including a controller 60 and a processor 85, which may optionally be the same processor used for analyzing logging data and which together with the controller 60 can serve multiple functions. The controller 60 and processor 85 need not be on the surface as shown. For example, in some embodiments, alternatively or in addition, the controller 60 and/or processor 85 may be part of the MWD (or LWD) modules 120, 120A, 130, 130A on which the sensor array according to this disclosure is positioned.

Figure 3:
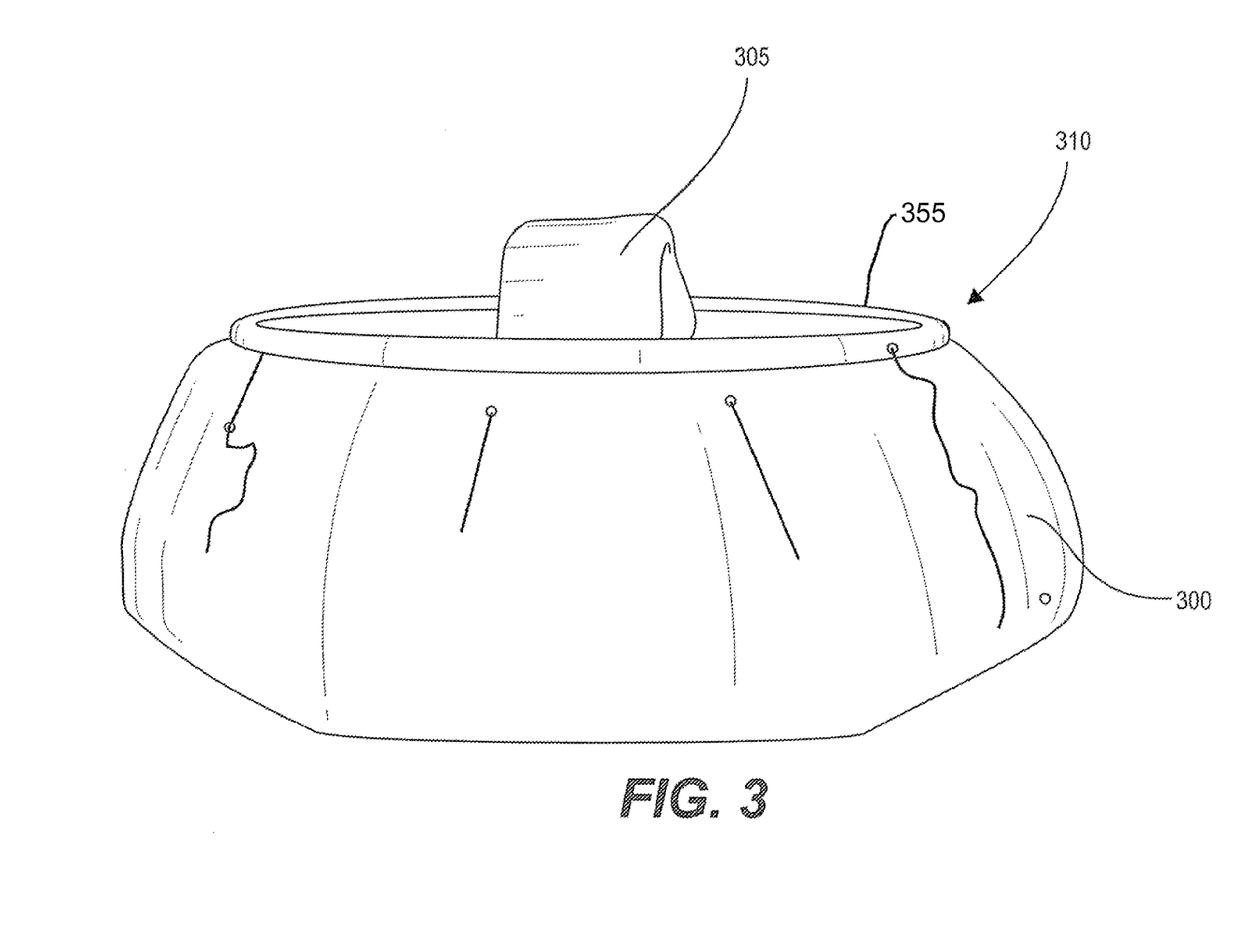
FIG. 3 is a schematic illustration of an onion tank, which can be used as a source pit in accordance with an embodiment of this disclosure.

A land seismic device 310 in accordance with this disclosure is illustrated in FIG. 3. The device 310 includes a seismic source (also referred to as a source of acoustic energy) (not shown in FIG. 3) immersed in a liquid (for example, water) contained in a storage tank 300. In some embodiments, the source does not touch the bottom of the storage tank 300, and is surrounded by liquid. For example, the source may be suspended in the storage tank 300 by a buoy 305 such that it does not touch the bottom of the storage tank 300. In other embodiments, the source may be suspended or held above the floor of the storage tank 300 and/or beneath the surface of the liquid.

The source can be any suitable source for generating acoustic energy. In some embodiments, the source is an air gun, such as a 20 cu. in., 40 cu. in., 150 cu. in or 250 cu. in air gun or larger. In some embodiments, the source is more than one air gun within the same storage tank 300. In some embodiments, the air gun is waterproof, although some amount of water may enter the air gun; for example, when the air gun fills there may be some cavitations in the water around the air gun firing ports and a small amount of water may enter the air gun. In some embodiments, the air gun is waterproof in the ready-to-fire status and electrical leads to the air gun are sealed with O-rings.

Regarding the storage tank 300, it can be a standard 'onion tank' type water tank. Such onion tanks can have many different sizes. The storage tank 300 shown in FIG. 3 has a 5.5 m diameter, is 1.5 m high and can hold about 30 tonnes of water. Other suitable tanks may include those which have a 7.9 m diameter and are 2.4 m high and can hold about 77 tonnes of water and those that have a 2 m diameter and are 1 m high and can hold about 3 tonnes of water. The specific size and shape of the storage tank (whether an actual onion tank or other similar storage tank) will be driven by the choice and number of acoustic energy sources that are deployed in the storage tank. Specifically, in some embodiments, the size and shape of the storage tank are chosen to insure that the air gun (or air guns as the case may be), when placed in the storage tank, sits (or sit if more than one air gun) below the surface of the liquid but above the bottom of the storage tank.

The storage tank 300 can be made of any material capable of withstanding the pressure generated by the chosen acoustic energy source such that the storage tank 300 does not fall apart. In some embodiments, the storage tank material is chosen such that the device can withstand the pressure generated by the acoustic energy source, for example over repeated activations of the energy source. In further embodiments, the material is chosen such that the source signature remains same or similar over repeated activations of the acoustic energy source, for example over at least about 100 activations or more, or at least about 1000 activations or more, or at least about several thousand activations or more. In some embodiments, the source signature may vary about +/−10% (have about a 90% consistency). As a person of skill understands, source signature consistency may depend on pressure, depth, volume, synchronization (if more than one gun) and pit shape (if land operation). Quality control (QC) software may be used to monitor and/or evaluate shot-by-shot coherency. In some embodiments, the default value for determining source consistency is set at 70%, i.e. as each shot is recorded, the software compares the shot with the previous shot and if the coherency is greater or equal to 70%, the shot is accepted into the stack. A stack may be produced after acquiring a number of shot traces, which have a coherency of equal to or greater than 70%. For example, if there are five shots available for stacking, the resultant stack is the median of the five shots.

Figure 6:
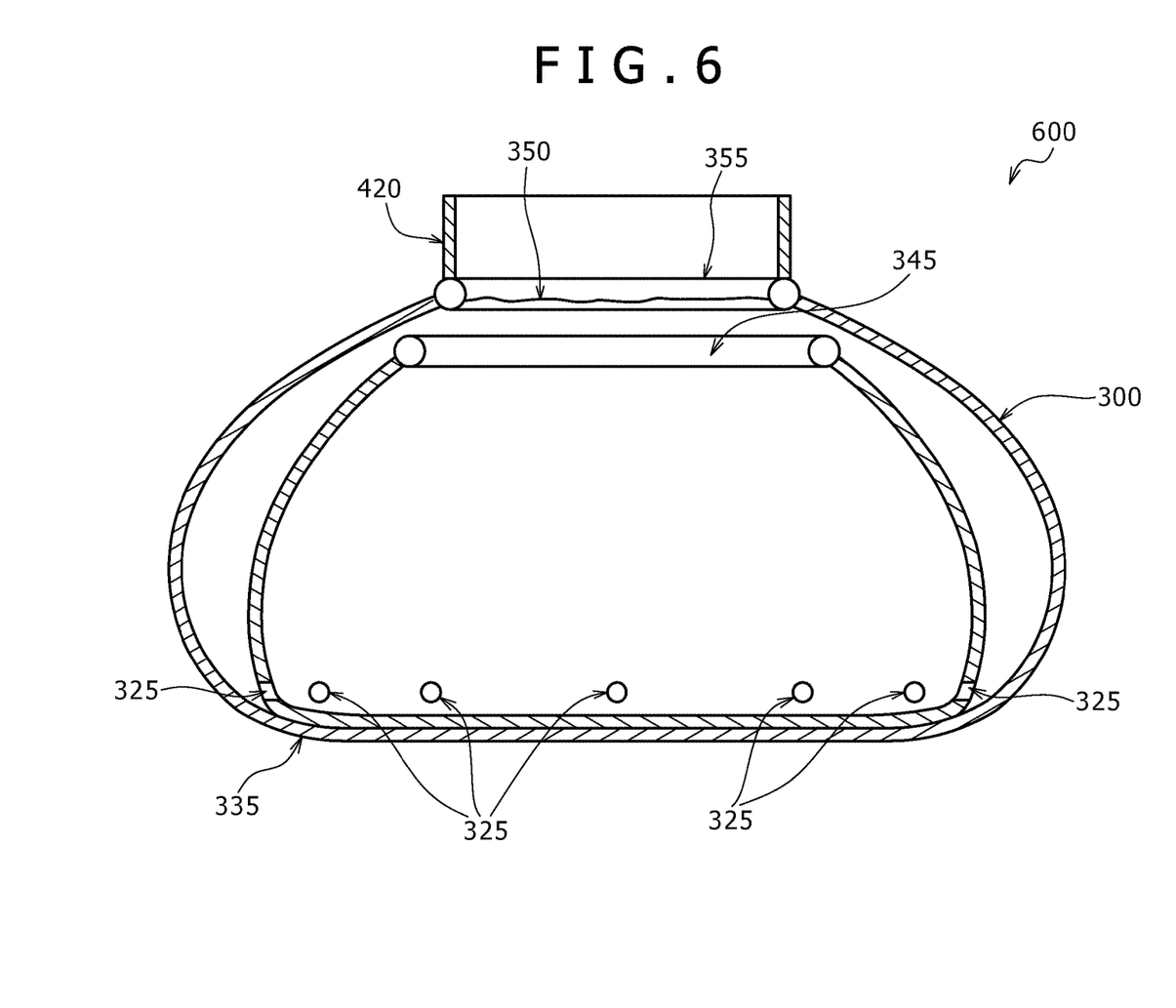
FIG. 6 is a schematic illustration of a source pit having an inner baffle in accordance with another embodiment of this disclosure.

In some embodiments, the material is a tough PVC, Mil Spec Urethane or other material suitable for use to make onion tanks. In some embodiments, the storage tank 300 material may be thicker than that of standard onion tanks, for example to reduce stress on the storage tank 300 as a result of the acoustic energy source being fired. In some embodiments, the storage tank 300 may also include a baffle membrane to further reduce stress on the storage tank 300 as a result of the acoustic source of energy being fired. For example, the baffle membrane may be positioned on the interior side (for example lining the interior side of the PVC, Mil Spec Urethane or other suitable material) of the storage tank 300. As shown in FIG. 6, in some embodiments, the baffle 315 may effectively be an inner tank inside the storage tank 300, configured to result in a liquid 350 (e.g. water) pressure/height that is the same on both sides of the baffle. In the case of the embodiment of FIG. 6, the baffle 315 is welded to the bottom 335 of the storage tank 300 using, for example, a heat process and is held in an upright position in use by an inner baffle flotation ring 345. The exemplified baffle 315 also includes openings 325 which facilitate equalization of the liquid 350 (e.g. water) on either side of the baffle 315. In some embodiments, the baffle 315 is configured to absorb the pressure wave after the air gun is (or air guns are) fired, rather than having the storage tank 300 absorb the pressure wave. The entire configuration is referred to as storage tank 600.

In some embodiments, the storage tank 300 is portable. For example, in the embodiment of FIG. 3, the storage tank 300 lays flat when not in use and empty of liquid, is self-supporting, and rises on its own as it is filled with liquid. In further embodiments, the storage tank 300 is reusable. For example, the storage tank 300 can be filled with liquid from a tanker, drained (for example the liquid can be pumped out and back into the tanker) after the seismic survey is completed or when desired, moved to a new location, and re-filled for additional use.

Figure 4:
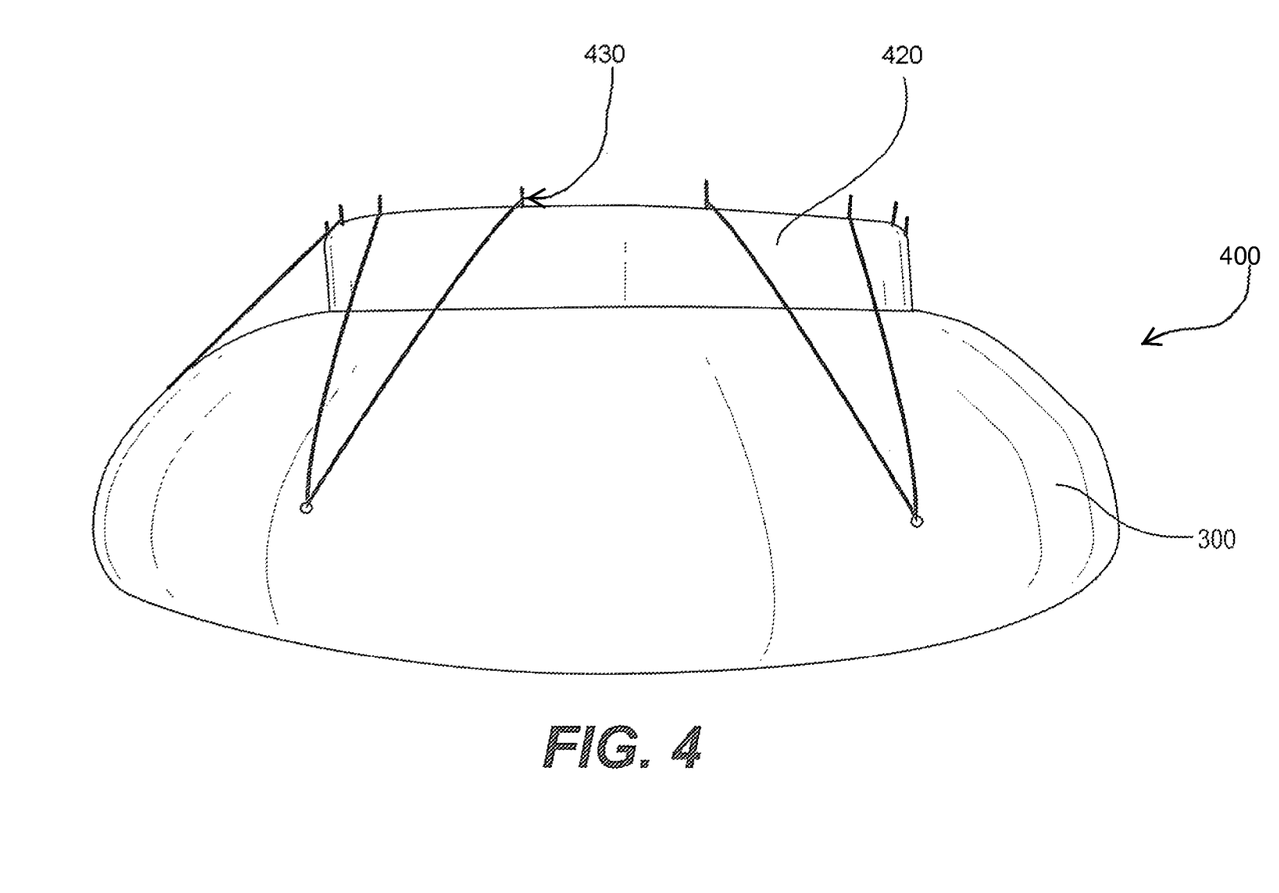
FIG. 4 is a schematic illustration of a modified onion tank having a splash guard which also can be used as a source pit in accordance with another embodiment of this disclosure.

FIG. 4 illustrates a modification of the storage tank 300 of FIG. 3. Specifically, the storage tank 400 includes a splash guard 420 along the circumference of the top opening to alleviate overflow of liquid, which may be displaced when the acoustic energy source fires. In some embodiments, the height of the splash guard 420 is chosen in anticipation of the height of the liquid motion and bubble breaks as a result of firing the acoustic energy source. In some embodiments, the splash guard 420 is configured to maintain portability and reusability of the storage tank. The splash guard 420 may be a separate component from the storage container portion of the storage tank 400, which is welded to the top of the flotation ring 355 (see FIG. 3) of the storage tank. In some embodiments, the splash guard 420 may be configured with pockets for receiving rods 430 such as nylon rods for keeping the splash guard upright.

The present disclosure also provides land seismic systems. For example, in some embodiments, the systems include an acoustic energy source contained in a liquid (e.g. water)-filled storage tank, which may be set up above-ground; one or more sensors, which may be at the surface or downhole or combinations thereof; and may optionally include a processor for analyzing data collected by the one or more sensors. One such land seismic system is shown in FIG. 1, wherein the sensors 213 are located downhole as part of a VSP apparatus, the seismic source 203 (optional additional seismic sources 203 are shown with dashed-line) is located at the surface and is contained in a liquid-filled tank 200, and the processors (not shown) may be at the surface or downhole. Another such land seismic system is shown in FIG. 2, wherein the sensors are also located downhole as part of MWD/LWD modules 120, 120A, 130, 130A, the source (not shown) is located at the surface and is contained in a liquid-filled storage tank, and the processors are located downhole, for example as part of the MWD/LWD modules 120, 120A, 130, 130A or above surface as shown at processor 85.

The present disclosure also relates to methods of inducing seismic signals. In some embodiments, the methods include activating a source of acoustic energy immersed in liquid contained in a storage tank as described above.

In further embodiments, the methods involve first setting up the seismic-source storage tank(s) structure at the well site or nearby the well site, depending on the chosen seismic configuration, for example depending on the specific Vertical Seismic Profile (VSP) configuration. For example, for Zero Offset VSP the source may be close to the wellhead. For Vertical Incidence VSP for which there is a deviated well, the source may be positioned vertically above the receiver in the well and there may be many different source positions. As another example, in Offset VSP the source may be positioned in a fixed position or several fixed positions at a large distance from the wellhead, such as for example about 1000 m, about 2000 m, or further. As yet another example, in Walkaway VSP the source may be located at different positions, usually along a straight line where terrain permits.

Set-up is described below as it pertains to the storage tank embodiment illustrated in FIG. 3. As a first step, set-up may involve choosing or preparing an appropriate site. In some embodiments, an appropriate site is one that is sufficiently flat (e.g. in some embodiments the site is completely flat) to provide a level base for the storage tank 300 for stability purposes. The device and/or site may also be configured to insure adequate contact between the storage tank and the ground in order to propagate sufficient energy into the ground. For example, in some embodiments, where the site may have some slope resulting in more water collecting on one side of the tank versus another, the weight of the water contained in the tank may still insure sufficient contact between the storage tank and the ground. For example, at the bottom of a 77 tonne tank, weight per $m^2$ is about 2.4 tonnes in a radius of approximately 3 m from the center of the storage tank. In other words, in some embodiments, the storage tank is surface-mounted and the method does not involve digging a pit. However, the methods may involve site preparation such as leveling the ground when appropriate prior to setting up the storage tank. In some embodiments, the storage tank may be set up in a source pit or pit dug in the ground.

In some embodiments, a base floor may be laid out on the chosen site, for example after the ground is prepared (leveled) in anticipation of setting up the storage tank. The base floor may be used to assist in creating a level base for the storage tank and/or assist with weight distribution should the ground have different consolidation levels across the base and/or to protect the bottom of the storage tank from sharp stones or other ground objects which may damage the storage tank bottom. In some embodiments, the base floor is a portable flooring product. In some embodiments, the base floor may be formed from plywood sheets, such as 8×4 foot, 25 mm plywood sheets.

After the storage tank (or for example onion tank or onion tank-inspired structure) is unpacked and spread out over the base floor, it is filled with liquid such as water. The storage tank may be self-supporting and rise from its flattened rest position as it is filled with water. An air gun source can then be centered in the middle of the storage tank such that it is underneath the surface of the liquid and also above the bottom of the storage tank. A buoy may be used to suspend the acoustic source of energy (e.g. air gun) in the desired position in the tank.

In some embodiments, set-up further involves positioning more than one air gun in a single storage tank, or setting up more than one storage tank at a single site. For example, two 150 cu.in air gun sources at a pressure of 2000 psi may be placed into a single 7.9 m diameter, 2.4 m high onion storage tank. As another example, each of a 20 cu.in and 40 cu.in air gun source at a pressure of 2000 psi may be placed into a single 2 m diameter, 1 meter high onion storage tank. As another example, two 150 cu.in air guns may be placed in each of three 7.9 m diameter, 2.5 m high storage tanks and the storage tanks may be positioned adjacent one another in a triangular configuration.

In some embodiments, local considerations, for example, may limit the energy of the acoustic source. In such cases, the methods may involve setting up multiple 'miniature' seismic-storage tank configurations. For example, the storage tanks may be only 1 or 2 m in diameter and store only a few cubic meters of liquid. A small, lower powered air gun source could be used, and in order to compensate for the weak seismic signals, a number of shots could be averaged or stacked. In some embodiments, the data is median stacked. A suitable air gun for such a miniature setup might have a displacement of only 20 or 40 cubic inches, for example.

The present disclosure also provides land seismic methods. In general, the methods can be any suitable land seismic methods, with the seismic waves being induced at least by a source immersed in a storage tank as described herein. Thus for example, the methods may involve initiating a source of acoustic energy immersed in liquid contained in a storage tank, such as an above-ground storage tank as described herein, using one or more sensors to record signals generated by initiating the source such as signals reflected at formation boundaries, and analyzing data obtained from the recorded signals for geophysical information for example. In further embodiments, the methods are part of an overall seismic survey service, where the storage tank is installed, filled with liquid, and air gun source is deployed.

In some embodiments, the receivers (recording sensors) may be arrays of surface geophones. In some embodiments, the receivers are borehole sensors such as one or more levels of the Schlumberger Versatile Seismic Imager downhole receiver tool (VSI™) or the single level Schlumberger seismicVISION™ tool. These downhole tools may be lowered into a well (for example exploration, appraisal, development or Reservoir Management) and depending on the borehole seismic survey type, the tool may be positioned at multiple depth settings in the well, with multiple shots being fired at each depth setting from the acoustic source (e.g. the air gun source). Borehole seismic surveys may involve firing the source less than one hundred firings, or several hundred to several thousand firings.

In some embodiments, the sensors may be a fiber-optic sensor array or fully distributed fiber optic vibration (or acoustic) sensor. An example use of fiber-optic cables as distributed acoustic sensors is described in Barberan, C. et al., "Multi-offset seismic acquisition using optical fiber behind tubing," EAGE 2012, Copenhagen, Denmark). In essence, a conventional optic fiber, when interrogated by pulses of coherent light can act as a distributed sensor of mechanical vibrations. One such system is described by Hartog, A. H. and K. Kader, 2012, "Distributed fiber optic sensor system with improved linearity," U.S. Pat. Pub. No. 2012/0067118. Other optical sensors, formed into discrete arrays, may also suitably be used with the storage tanks described herein with suitable acoustic sources of energy. One example of another such array of acoustic sensors is described in Cranch, G. A. and P. J. Nash, "Large-scale multiplexing of interferometric fiber-optic sensors using TDM and DWDM," Journal 4664774 of Lightwave Technology, 19(5): p. 687-699 (2001).

In some embodiments, such as where the storage tank is transportable and reusable, the storage tank may be accompanied by a tanker or other liquid supply to fill it with liquid. In further such embodiments, once the borehole seismic survey is completed, the air gun may be removed from the storage tank, the tank may be drained of liquid (or the liquid may be pumped back into a tanker or other receptacle), and the storage tank and base floor may be packed up and loaded onto a truck for storage and/or to be moved to a new site. In other such embodiments, multi-point surface location surveys may be conducted. For example, multiple storage tanks may be made available and one of the storage tanks can be used while the others are being moved to a new surface location, filled with liquid (for example, water), and made ready with an air gun source for the next depth setting of the downhole tool. Further, for example, after the first storage tank is used to fire the air gun source, it can then be pumped out into the tanker, packed up and moved to a new surface location, and can be re-filled and made ready for an additional use. In some embodiments, the land air gun source-storage tank devices are used in connection with more advanced borehole seismic surveys (such as vertical incidence Vertical Seismic Profiles (VSPs), Fixed Offset VSPs and walkaway VSPs with land air gun sources).

Figure 5:
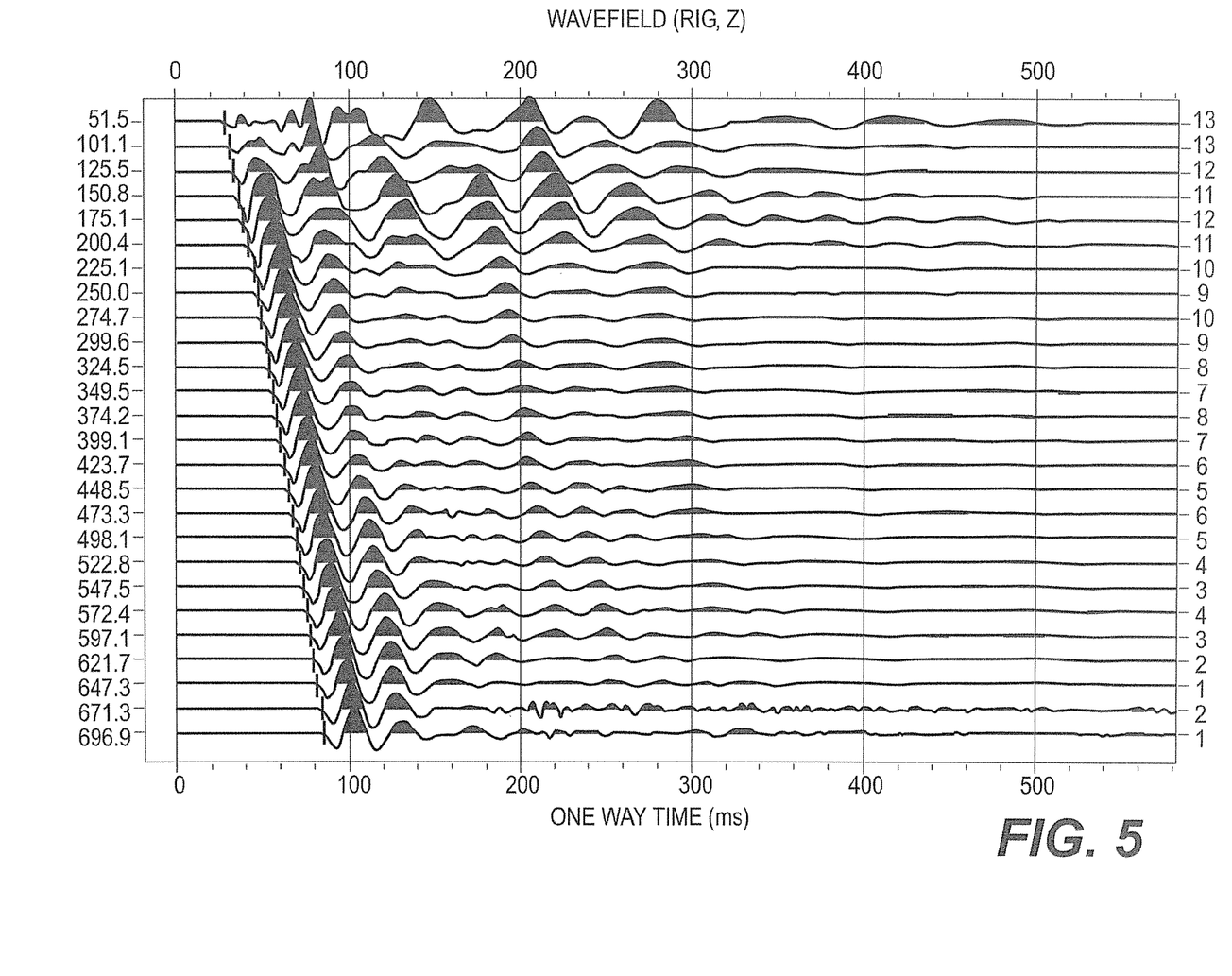
FIG. 5 is a graph of data recorded from a 26 level Vertical Seismic Profile using 5 shots and a dual shuttle VSI™ downhole receiver tool.

FIG. 5 provides data recorded in performing a land seismic method in accordance with this disclosure. Specifically, data was recorded using a single air gun source (150 cu. in G-Gun at 2000 psi) and a two level VSI™ receiver tool deployed in a 770 foot deep well. A twenty-six level VSP was recorded in which 5 shots were recorded per depth setting of a dual shuttle VSI™ downhole receiver tool. 95% coherent data was seen on the three orthogonal axis (X, Y, Z) of the VSI™ tool. The air gun source signature recorded from the PAT showed excellent source signature consistency which is desirable for any borehole seismic survey and not often seen when using conventional pit design. Thus, initial experimentation has shown that storage tanks such as onion tanks or onion-tank like surface storage units may be a good alternative solution for the current air gun source pit design, offering a very constant source signature in some embodiments.

While the detailed description has been made with respect to a limited number of embodiments, those skilled in the art, having the benefit of this disclosure, will appreciate numerous modifications and variations there from. It is intended that the appended claims cover such modifications and variations as fall within the true spirit and scope of this disclosure.

What is claimed is:

1. A land seismic device, comprising:
    an acoustic energy source;
    a source controller to initiate discharge of the acoustic energy source;
    an above-ground flattenable storage tank having a bottom, wherein the storage tank is configured to hold the acoustic energy source immersed in a volume of liquid and above the bottom of the storage tank; and
    wherein an interior of the storage tank is provided with a baffle configured as an inner tank wherein a pressure wave of the acoustic energy source is absorbed by the baffle rather than directly by a wall of the storage tank.

2. A land seismic device according to claim 1, wherein the storage tank is an onion storage tank.

3. A land seismic device according to claim 1, wherein the storage tank rises and is self-supporting the storage tank fills with water.

4. A land seismic device according to claim 1, wherein the storage tank is configured to withstand pressure generated when the acoustic energy source is activated, remaining intact and maintaining a similar source signature over repeated acoustic energy source activations.

5. A land seismic device according to claim 1, wherein the storage tank has a top opening and the storage tank further comprises a splash guard around the top opening to contain liquid from overflowing when the acoustic energy source is activated.

6. A land seismic device according to claim 1, wherein the acoustic energy source is an air gun.

7. A land seismic device according to claim 1, wherein the acoustic energy source is more than one acoustic energy source and the source controller is configured for synchronization of the acoustic energy sources.

8. A land seismic system, comprising a land seismic device according to claim 1; one or more sensors for recording signals generated by activating the acoustic energy source; and a processor for analyzing the recorded signals for geophysical information.

9. A land seismic system according to claim 8, wherein the one or more sensors are optical sensors.

10. A land seismic system according to claim 8, wherein the one or more sensors are a distributed optical fiber vibration sensor.

11. A method for inducing seismic pulses, comprising:
    initiating a source of acoustic energy immersed in liquid contained in an above-ground flattenable storage tank;
    wherein the storage tank rises and is self-supporting when filled with the liquid; and
    wherein an interior of the storage tank is provided with a baffle configured as an inner tank wherein a pressure wave of the acoustic energy source is absorbed by the baffle rather than directly by a wall of the storage tank.

12. A method according to claim 11, wherein the storage tank is an onion tank and the source of acoustic energy is located beneath a top surface of the liquid and above a bottom of the tank.

13. A land seismic method, comprising:
    initiating a source of acoustic energy immersed in liquid contained in an above-ground flattenable storage tank, wherein the storage tank rises and is self-supporting when filled with the liquid and
    wherein an interior of the storage tank is provided with a baffle configured as an inner tank wherein a pressure wave of the acoustic energy source is absorbed by the baffle rather than directly by a wall of the storage tank;
    using one or more sensors to record reflected signals generated by activating the source; and
    analyzing data obtained from the recorded signals for geophysical information.

14. A land seismic method according to claim 13, wherein the one or more sensors are located in a subsurface well.

15. A land seismic method according to 13, wherein the one or more sensors are part of a drill string.

16. A land seismic method according to claim 13, further comprising: preparing a well site, setting up the above-ground storage tank on the well site by filling the storage tank with the liquid, and immersing the acoustic energy source in the liquid in the storage tank.

17. A land seismic method according to claim 16, further comprising laying a base floor down on the prepared site before setting up the above-ground storage tank.

18. A land seismic method according to claim 13, wherein the method is multi-point surface location survey and the method further comprises setting up multiple land seismic devices comprising an acoustic energy source immersed in a volume of liquid contained in an above-ground storage tank.

19. A land seismic method according to claim 18, wherein the multi-point location survey is according to a Vertical Seismic Profile (VSP) configuration.

* * * * *